(12) United States Patent
Fujita et al.

(10) Patent No.: US 9,970,522 B2
(45) Date of Patent: May 15, 2018

(54) AUTOMATIC TRANSMISSION (71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Hiroshi Fujita, Nishio (JP); Takeshi Otsuki, Hekinan (JP); Michio Yoshida, Susono (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/328,720

(22) PCT Filed: Aug. 4, 2015

(86) PCT No.: PCT/JP2015/072011
§ 371 (c)(1),
(2) Date: Jan. 24, 2017

(87) PCT Pub. No.: WO2016/024494
PCT Pub. Date: Feb. 18, 2016

(65) Prior Publication Data
US 2017/0211672 A1 Jul. 27, 2017

(30) Foreign Application Priority Data
Aug. 12, 2014 (JP) .................. 2014-164132

(51) Int. Cl.
F16H 37/08 (2006.01)
F16H 59/44 (2006.01)
F16H 61/70 (2006.01)

(52) U.S. Cl.
CPC ......... *F16H 37/0846* (2013.01); *F16H 59/44* (2013.01); *F16H 61/702* (2013.01)

(58) Field of Classification Search
CPC ..... F16H 37/0846; F16H 59/44; F16H 61/702
See application file for complete search history.

(56) References Cited

U.S. PATENT DOCUMENTS

| | | | |
|---|---|---|---|
| 6,306,057 B1 * | 10/2001 | Morisawa | B60K 6/365 475/5 |
| 9,849,885 B2 * | 12/2017 | Sakamoto | B60W 30/19 |
| 2009/0017957 A1 | 1/2009 | Triller et al. | |

(Continued)

FOREIGN PATENT DOCUMENTS

| | | |
|---|---|---|
| JP | 2010-530502 A | 9/2010 |
| WO | 2013/176208 A1 | 11/2013 |

(Continued)

OTHER PUBLICATIONS

Nov. 10, 2015 Search Report issued in International Patent Application No. PCT/JP2015/072011.

*Primary Examiner* — Jacob S. Scott
*Assistant Examiner* — Tinh Dang
(74) *Attorney, Agent, or Firm* — Oliff PLC (57) ABSTRACT

An automatic transmission where an engagement mode in which the forward engagement element is put in the engagement state is executed when the vehicle travels forward in the second mode in which the second engagement element is put in the engagement state and the first engagement element is put in a release state.

12 Claims, 2 Drawing Sheets (56) References Cited

U.S. PATENT DOCUMENTS

| | | | |
|---|---|---|---|
| 2009/0017959 A1 | 1/2009 | Triller | |
| 2009/0017960 A1 | 1/2009 | Triller et al. | |
| 2009/0247341 A1* | 10/2009 | Abe | B60K 6/26 |
| | | | 475/5 |
| 2015/0087452 A1* | 3/2015 | Yoshino | F16H 37/021 |
| | | | 474/1 |
| 2015/0087463 A1* | 3/2015 | Nakagawa | F16H 37/022 |
| | | | 475/201 |
| 2015/0135894 A1* | 5/2015 | Kobayashi | F16H 37/021 |
| | | | 74/664 |
| 2015/0167802 A1* | 6/2015 | Yoshida | F16H 37/022 |
| | | | 475/211 |
| 2015/0354682 A1* | 12/2015 | Yamamoto | F16H 37/0846 |
| | | | 475/198 |
| 2016/0131256 A1* | 5/2016 | Toyoda | F16H 37/022 |
| | | | 701/51 |
| 2016/0186846 A1* | 6/2016 | Kidokoro | F16H 37/022 |
| | | | 474/8 |

FOREIGN PATENT DOCUMENTS

| | | |
|---|---|---|
| WO | 2014/073479 A1 | 5/2014 |
| WO | 2014/199458 A1 | 12/2014 |

\* cited by examiner

AUTOMATIC TRANSMISSION

BACKGROUND

The disclosure relates to an automatic transmission having a continuously variable transmission mechanism and a forward/backward switching device, more particularly to an automatic transmission having a first power transmission path provided via a forward/backward switching device and a second power transmission path provided parallel to the first power transmission path via a continuously variable transmission mechanism.

Conventionally, as an automatic transmission appropriate for, for example, a vehicle, there is a widely used automatic transmission having a belt type continuously variable transmission mechanism that has a pair of pulleys and a metal belt (or chain) wound around the pulleys and continuously varies the speed by changing the effective diameters of the pulleys. In addition, there is a known automatic transmission using a toroidal type continuously variable transmission mechanism, a cone ring type continuously variable transmission mechanism, or the like in addition to a belt type continuously variable transmission mechanism.

In addition, as such an automatic transmission, there is a developed automatic transmission having two parallel power transmission paths, which are a first power transmission path coupling the input shaft to the output shaft via a forward/backward switching device and a second power transmission path coupling the input shaft to the output shaft via a continuously variable transmission mechanism (see WO2013/176208). In the automatic transmission, the forward/backward switching device has a first clutch for forward travel and a brake for backward travel and a dog clutch is present in the first power transmission path and a second clutch is present in the second power transmission path.

In addition, the dog clutch is configured by a synchromesh mechanism including a first rotary shaft, disposed in the part of the first power transmission path on the forward/backward switching device side from the dog clutch, that operates together with the forward/backward switching device, a second rotary shaft, disposed in the part of the first power transmission path on the output shaft side from the dog clutch, that operates together with the output shaft, and a synchronizer sleeve (referred to below as the sleeve), provided concentrically with the first rotary shaft and the second rotary shaft movably in the shaft direction, that can mesh with the meshing portions of the first rotary shaft and the second rotary shaft. At least parts of the first rotary shaft and the second rotary shaft are formed as a double shaft overlapped in the shaft direction.

In the automatic transmission, when the vehicle starts traveling forward or travels forward at a speed less than a predetermined speed, a non-continuously variable mode is entered in which the first clutch and the dog clutch are put in the engagement state and the second clutch is put in the release state to travel at a forward low speed stage without performing a continuously variable speed change so that the driving torque from a driving source is transferred from the input shaft to the output shaft using the first power transmission path. Alternatively, when the vehicle travels forward at a speed equal to or more than the predetermined speed, the second clutch is put in the engagement state and the first clutch and the dog clutch are put in the release state to enter a continuously variable mode so that the driving torque from the driving source is transferred from the input shaft to the output shaft using the second power transmission path.

SUMMARY

However, in the automatic transmission described in WO2013/176208, when the vehicle travels forward at a speed equal to or more than the predetermined speed, the second clutch is put in the engagement state and the first clutch and the dog clutch are put in the release state to enter the continuously variable mode so that the driving torque from the driving source is transferred from the input shaft to the output shaft using the second power transmission path. Accordingly, differential rotation is generated between the second rotary shaft operating together with the second power transmission path to which power is transferred and the first rotary shaft operating together with the forward/backward switching device to which power is not transferred due to disconnection by the first clutch and the dog clutch, and the differential rotation (relative rotational speed) becomes larger particularly when the vehicle travels at a high speed. When a bearing such as a needle bearing is present between the first rotary shaft and the second rotary shaft so as to support the first rotary shaft and the second rotary shaft in a relatively rotatable manner, since a large friction force is generated in the bearing when the differential rotation is large, the service life of the bearing may be shortened.

An exemplary aspect of the present disclosure provides an automatic transmission that has a first rotary shaft operating together with a forward/backward switching device and a second rotary shaft operating together with the output shaft, which are present in a power transmission path provided via a forward/backward switching device, and can reduce the relative rotational speed between the first rotary shaft and the second rotary shaft when the vehicle travels forward at a high speed.

An automatic transmission according to an exemplary aspect of the disclosure includes an input shaft to be drivably coupled to a driving source of a vehicle; a drive shaft to be drivably coupled to a wheel; a forward/backward switching device having a forward engagement element forming a path for transferring rotation in a forward direction of the vehicle when engaged and a backward engagement element forming a path for transferring rotation in a backward direction of the vehicle when engaged; a transmission mechanism capable of changing a transmission shift ratio; a first engagement element present in a first power transmission path coupling the input shaft to the drive shaft via the forward/backward switching device; a second engagement element present in a second power transmission path coupling the input shaft to the drive shaft via the transmission mechanism; wherein a first mode is entered in which the forward engagement element and the first engagement element are put in an engagement state and the input shaft is connected to the drive shaft via the first power transmission path for rotational transfer when the vehicle travels forward at a speed less than a predetermined speed or a second mode is entered in which the second engagement element is put in the engagement state and the input shaft is connected to the drive shaft via the second power transmission path for rotational transfer when the vehicle travels forward at a speed equal to or more than the predetermined speed, a first rotary shaft disposed in a part of the first power transmission path on the forward/backward switching device side from the first engagement element, the first rotary shaft operating together with the forward/backward switching device; a second rotary shaft disposed in a part of the first power transmission path on a shaft side of one of the input shaft and the drive shaft from the first engagement element, the second rotary shaft operating together with the one of the input shaft and the drive shaft, the second rotary shaft being disposed as a double shaft overlapped in a shaft direction with the first rotary shaft; and a bearing present so as to be overlapped in the shaft direction with the first rotary shaft and the second rotary shaft between the first rotary shaft and the second rotary shaft, the bearing supporting the first rotary shaft and the second rotary shaft in a relatively rotatable manner, wherein an engagement mode in which the forward engagement element is put in the engagement state is executed when the vehicle travels forward in the second mode in which the second engagement element is put in the engagement state and the first engagement element is put in a release state.

In the automatic transmission, since the engagement mode in which the forward engagement element is put in the engagement state is executed when the vehicle travels forward in the second mode in which the second engagement element is put in the engagement state and the first engagement element is put in the release state, the driving torque input from the input shaft is transferred to the drive shaft via the second engagement element in the second power transmission path and is rotationally transferred to the second rotary shaft operating together with the second power transmission path. At the same time, the driving torque input from the input shaft is rotationally transferred to the first rotary shaft via the forward engagement element in the first power transmission path. At this time, the rotational direction of the first rotary shaft is the same as the rotational direction of the second rotary shaft. Accordingly, since the first rotary shaft and the second rotary shaft rotate in the same direction, the relative rotational speed between the first rotary shaft and the second rotary shaft becomes smaller than in the release mode in which the forward engagement element is released. Accordingly, since the relative rotational speed between the first rotary shaft and the second rotary shaft can be reduced when the vehicle travels forward at a high speed, it is possible to reduce the friction force generated in the bearing supporting the first rotary shaft and the second rotary shaft in a relatively rotatable manner, reduce the wear speed of the bearing, and prolong the service life of the bearing. The engagement in the engagement mode includes a so-called half engagement state in which the second engagement element is engaged while slipping in addition to a full engagement state in which the second engagement element is engaged without slipping. That is, since rotation can be transferred to the first rotary shaft even when the second engagement element is in the half engagement state, the relative rotational speed between the first rotary shaft and the second rotary shaft can be reduced.

BRIEF DESCRIPTION OF THE DRAWINGS

Various exemplary aspects of the disclosure will be described with reference to the drawings, wherein:

FIGS. 2A and 2B illustrate the operation of the automatic transmission according to the embodiment.

DETAILED DESCRIPTION OF EMBODIMENTS

Figure 1:
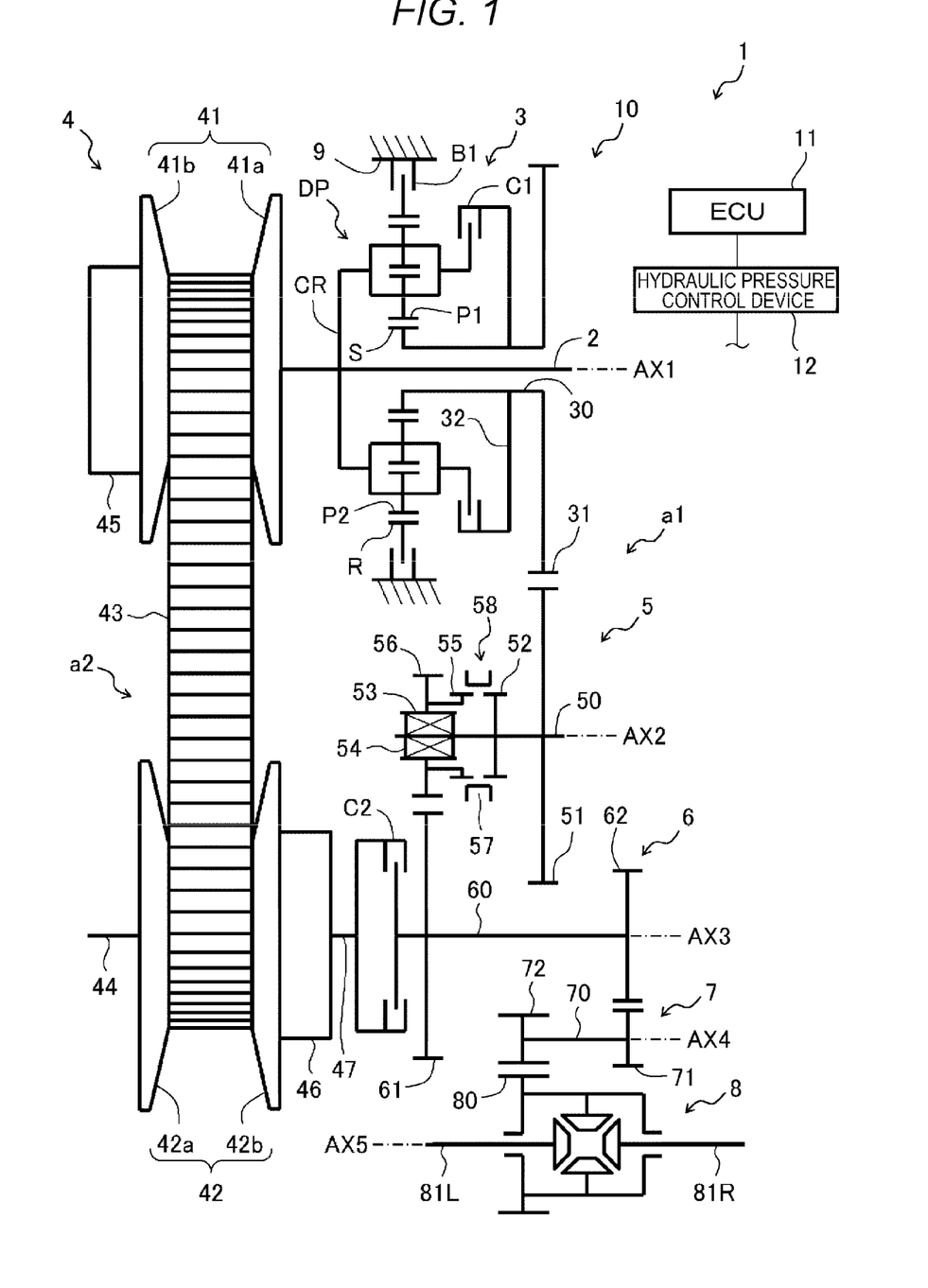
FIG. 1 is a skeleton view illustrating an automatic transmission according to the embodiment.
Figure 2A:
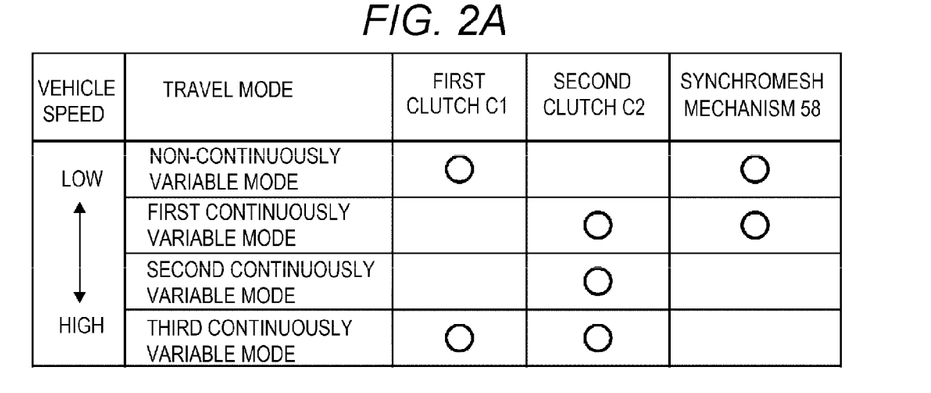
FIG. 2A is an engagement table.

An embodiment of the disclosure will be described below with reference to FIG. 1 and FIG. 2. In this specification, "drivably coupling" indicates the state in which rotary elements are coupled to each other so as to transfer a driving force and includes the state in which the elements are coupled to each other so as to be integrally rotatable or the state in which the elements are coupled to each other via a clutch or the like so as to transfer a driving force.

The schematic structure of a vehicle 1 having an automatic transmission 10 according to the embodiment will be described with reference to FIG. 1. The vehicle 1 includes the automatic transmission 10, a control device (ECU) 11, and a hydraulic pressure control device 12.

The automatic transmission 10 includes a torque converter (not illustrated), a forward/backward switching device 3 having an input shaft 2, a continuously variable transmission mechanism (transmission mechanism) 4, a deceleration gear mechanism 5, an output gear portion 6 having a drive shaft 60, a countershaft portion 7, a differential device 8, and a transmission case 9 accommodating these components. In addition, in the automatic transmission 10, the first power transmission path a1 coupling the input shaft 2 of the forward/backward switching device 3 to the drive shaft 60 of the output gear portion 6 via the forward/backward switching device 3 and the second power transmission path a2 coupling the input shaft 2 to the drive shaft 60 via the continuously variable transmission mechanism 4 are formed. In addition, the automatic transmission 10 has first to fifth shafts AX1 to AX5 parallel to each other.

The first shaft AX1 is concentric with the crankshaft of an internal combustion engine (driving source), which is not illustrated. On the first shaft AX1, the input shaft of the automatic transmission 10 coupled to the crankshaft, the torque converter, the input shaft 2 of the forward/backward switching device 3 and the continuously variable transmission mechanism 4, a planetary gear DP of the forward/backward switching device 3, a first clutch (forward engagement element) C1, the first brake (backward engagement element) B1, and a primary pulley 41 of the continuously variable transmission mechanism 4 are disposed.

The deceleration gear mechanism 5 is disposed on the second shaft AX2. A secondary pulley 42 of the continuously variable transmission mechanism 4, the second clutch C2, and the output gear portion 6 are disposed on the third shaft AX3. The countershaft portion 7 is disposed on the fourth shaft AX4. The differential device 8 and left and right drive shafts 81L and 81R are disposed on the fifth shaft AX5.

The input shaft of the automatic transmission 10 to be coupled to the crankshaft is coupled to the input shaft 2 of the forward/backward switching device 3 and the continuously variable transmission mechanism 4 via the torque converter. The forward/backward switching device 3 includes the planetary gear DP, the first brake B1, and the first clutch C1. The input shaft 2 is connected to the primary pulley 41 of the continuously variable transmission mechanism 4 through the inner circumferential side of the planetary gear DP and connected to a carrier CR of the planetary gear DP. The planetary gear DP is configured by a so-called double pinion planetary gear having a sun gear S, a ring gear R, and a carrier CR rotatably supporting, a pinion P1 meshing with the sun gear S and a pinion P2 meshing with the ring gear R. In the ring gear R of these gears, rotation can be locked to the transmission case 9 by the first brake B1. In addition, the sun gear S is directly coupled to a hollow shaft 30, the carrier CR is connected to the hollow shaft 30 via the first clutch C1, and the hollow shaft 30 is coupled to a normal/reverse rotation output gear 31. The hollow shaft 30 is also coupled to a clutch drum 32 of the first clutch C1, and the normal/reverse rotation output gear 31, the hollow shaft 30, and the clutch drum 32 integrally constitute a rotary member.

The first clutch C1 forms a path through which rotation in the forward direction of the vehicle 1 is transferred when engaged and the first brake B1 forms a path through which rotation in the backward direction of the vehicle 1 is transferred when engaged.

The normal/reverse rotation output gear 31 meshes with an input gear 51 of the deceleration gear mechanism 5. The deceleration gear mechanism 5 has the synchromesh mechanism (first engagement element) 58 present in the first power transmission path a1. The deceleration gear mechanism 5 has a first rotary shaft 50 on the second shaft AX2, and the input gear 51 having a large diameter and a drive gear (first gear) 52 having a small diameter are integrally fixed and coupled to one side of the first rotary shaft 50. That is, the first rotary shaft 50 is disposed one the forward/backward switching device 3 side from the synchromesh mechanism 58 in the first power transmission path a1 and operates together with the forward/backward switching device 3.

On the outer circumferential side of the other side of the first rotary shaft 50, a second rotary shaft 53 configured by a hollow shaft is supported in a relatively rotatable manner by a bearing 54 configured by, for example, a needle bearing. That is, the second rotary shaft 53 is disposed on the drive shaft 60 side from the synchromesh mechanism 58 in the first power transmission path a1, operates together with the drive shaft 60, and is disposed as a double shaft overlapped in the shaft direction with the first rotary shaft 50. A driven gear (second gear) 55 having a diameter the same as in the drive gear 52 and an output gear 56 having a diameter slightly larger than in the drive gear 52 are integrally fixed and coupled to the second rotary shaft 53.

The bearing 54 includes a cylindrical inner race, a cylindrical outer race disposed on the outer circumferential side of the inner race, and a plurality of needles present between the inner race and the outer race, and the inner race and the outer race are relatively rotatable. In addition, the inner race is supported by the outer circumferential surface of the first rotary shaft 50 and the outer race is supported by the inner circumferential surface of the second rotary shaft 53. When at least one of the inner race and the outer race is also used as the first rotary shaft 50 or the second rotary shaft 53, the number of components can be reduced.

On the outer circumferential side of the drive gear 52 and the driven gear 55, a sleeve 57 having a tooth plane on its inner circumferential surface is provided movably in the shaft direction. The sleeve 57 is moved and driven in the shaft direction by a spoke (not illustrated) driven by a hydraulic pressure so as to be slidably driven to the position at which the sleeve 57 meshes with only the drive gear 52 and the position at which the sleeve 57 straddles and meshes with both the drive gear 52 and the driven gear 55. This enables the drive gear 52 and the driven gear 55 to be put in the separation state or the drivably coupling state. The output gear 56 meshes with an input gear 61 of the output gear portion 6. A synchronizer (not illustrated) is provided in the part of the driven gear 55 close to the drive gear 52. That is, the synchromesh mechanism 58 is configured by the synchronizer, the sleeve 57, the drive gear 52, and the driven gear 55 and the first rotary shaft 50 and the second rotary shaft 53 can be engaged or released.

The transmission shift ratio can be continuously changed in the continuously variable transmission mechanism 4 and a belt type continuously variable automatic transmission is used in the embodiment. However, the disclosure is not limited to the embodiment and, for example, a toroidal type continuously variable transmission mechanism, cone ring type continuously variable transmission mechanism, or the like may be used as the continuously variable transmission mechanism 4. The continuously variable transmission mechanism 4 includes the primary pulley 41 connected to the input shaft 2, the secondary pulley 42, and an endless belt 43 wound around the primary pulley 41 and the secondary pulley 42. The primary pulley 41 has a fixed sheave 41a fixed to the input shaft 2 not movably in the shaft direction and a movable sheave 41b supported by the input shaft 2 movably in the shaft direction, the fixed sheave 41a and the movable sheave 41b having walls, facing each other, that are formed in a cone. A groove portion having a V-shaped cross section formed by the fixed sheave 41a and the movable sheave 41b holds the belt 43.

Similarly, the secondary pulley 42 has a fixed sheave 42a fixed to a center axis 44 not movably in the shaft direction and a movable sheave 42b supported by the center axis 44 movably in the shaft direction, the fixed sheave 42a and the movable sheave 42b having walls, facing each other, that are formed in a cone. The groove portion having a V-shaped cross section formed by the fixed sheave 42a and the movable sheave 42b holds the belt 43. The fixed sheave 41a of the primary pulley 41 is disposed oppositely in the shaft direction to the fixed sheave 42a of the secondary pulley 42 across the belt 43.

In addition, a hydraulic servo 45 is disposed on the back side of the movable sheave 41b of the primary pulley 41 and a hydraulic servo 46 is disposed on the back side of the movable sheave 42b of the secondary pulley 42. The hydraulic servos 45 and 46 generate a belt holding pressure corresponding to a load torque by receiving a working oil hydraulic pressure and generate a holding pressure for changing or fixing the transmission shift ratio.

An output shaft 47 of the movable sheave 42b of the secondary pulley 42 is connected to the drive shaft 60 of the output gear portion 6 via the second clutch C2. That is, the second clutch C2 is present in the second power transmission path a2. The output gear portion 6 is configured by the drive shaft 60, the input gear 61 fixed and coupled to one end of the drive shaft 60, and a counter gear 62 fixed and coupled to the other end of the drive shaft 60 and the counter gear 62 meshes with a driven gear 71 of the countershaft portion 7.

The countershaft portion 7 is configured by a countershaft 70, the driven gear 71 fixed and coupled to the countershaft 70, and a drive gear 72 fixed and coupled to the countershaft 70 and the drive gear 72 meshes with a differential ring gear 80 of the differential device 8.

The differential device 8 is configured to transfer rotation of the differential ring gear 80 to the left and right drive shafts 81L and 81R while absorbing the differential rotation between the left and right drive shafts 81L and 81R and the left and right drive shafts 81L and 81R are coupled to the left and right wheels (not illustrated), respectively. Since the differential ring gear 80 meshes with the drive gear 72 and the driven gear 71 meshes with the counter gear 62, the drive shaft 60 of the output gear portion 6, the countershaft 70 of the countershaft portion 7, and the differential device 8 are drivably coupled to the wheels via the left and right drive shafts 81L and 81R and always operate together with the wheels.

The ECU 11 includes, for example, a CPU, a ROM storing processing programs, a RAM temporarily storing data, an input/output port, and a communication port and outputs various types of signals such as a control signal for the hydraulic pressure control device 12 and the like through the output port. An input shaft rotational speed sensor for detecting an input shaft rotational speed Nin of the input shaft 2, an output shaft rotational speed sensor for detecting an output shaft rotational speed Nout of the drive shaft 60, and the like are connected to the ECU 11 via the input port.

The ECU 11 executes the engagement mode in which the first clutch C1 is put in the engagement state when the vehicle 1 travels forward in the continuously variable mode (second mode) in which the second clutch C2 is put in the engagement state and the synchromesh mechanism 58 is put in the release state. In addition, the ECU 11 executes the release mode in which the first clutch C1 is put in the release state if a relative rotational speed N between the first rotary shaft 50 and the second rotary shaft 53 is less than a first threshold $N_1$ when the vehicle 1 travels forward in the continuously variable mode in which the second clutch C2 is put in the engagement state and the synchromesh mechanism 58 is put in the release state (see steps S2 and S3 in FIG. 2B). In addition, the ECU 11 executes the engagement mode in which the first clutch C1 is put in the engagement state if the relative rotational speed N between the first rotary shaft 50 and the second rotary shaft 53 is more than a second threshold $N_2$ that is more than the first threshold $N_1$ when the vehicle 1 travels forward in the continuously variable mode in which the second clutch C2 is put in the engagement state and the synchromesh mechanism 58 is put in the release state (see steps S5 and S6 in FIG. 2B). The second threshold $N_2$ is set to a value more than the first threshold $N_1$. This can make the frequency of hunting less than in the case in which one threshold is used to determine whether the release mode or the engagement mode is executed.

The hydraulic pressure control device 12 adjusts a hydraulic pressure generated by the oil pump to a line pressure and a secondary pressure based on the throttle opening using a primary regulator valve and a secondary regulator valve. In addition, the hydraulic pressure control device 12 has a plurality of solenoid valves and controls, for example, the transmission shift of the continuously variable transmission mechanism 4 and the engagement and release of the first clutch C1, the second clutch C2, the third clutch, and the first brake B1 using a hydraulic pressure according to an instruction from the ECU 11.

Next, the operation of the automatic transmission 10 will be described. For example, when the vehicle 1 having the automatic transmission 10 starts traveling forward or travels forward at a speed less than a predetermined speed, the non-continuously variable mode (first mode) (see FIG. 2A) is entered, the sleeve 57 straddles and meshes with the drive gear 52 and the driven gear 55 in the state in which the first brake B1 and the second clutch C2 are released, switching is made so that the synchromesh mechanism 58 is engaged, and the first clutch C1 is engaged. The input rotation input from the internal combustion engine to the input shaft 2 via the torque converter or lock-up clutch is transferred to the hollow shaft 30 as is because the sun gear S and the carrier CR are integrally rotated and directly connected by the engagement of the first clutch C1 in the planetary gear DP, and the transferred rotation is transferred as forward rotation from the normal/reverse rotation output gear 31 to the input gear 51 of the deceleration gear mechanism 5.

The reversed rotation transferred to the input gear 51 of the deceleration gear mechanism 5 is decelerated according to the difference in the diameter (difference in the number of teeth) between the normal/reverse rotation output gear 31 and the input gear 51 and transferred from the drive gear 52 to the output gear 56 as reversed rotation via the sleeve 57 and the driven gear 55, and transferred to the input gear 61 of the output gear portion 6 as forward rotation. In addition, the reduced forward rotation transferred to the input gear 61 of the output gear portion 6 is transferred as reversed rotation from the counter gear 62 to the driven gear 71 of the countershaft portion 7 while being decelerated according to the difference in the diameter (difference in the number of teeth) between the counter gear 62 and the driven gear 71. Then, the reduced reversed rotation transferred to the driven gear 71 of the countershaft portion 7 is further decelerated and reversed, and transferred from the drive gear 72 to the differential ring gear 80 of the differential device 8, thereby outputting forward rotation with a fixed transmission shift ratio as the forward low transmission shift stage mode to the wheels via the left and right drive shafts 81L and 81R.

In contrast, for example, when the vehicle having the automatic transmission 10 starts traveling backward or travels backward at a speed less than a predetermined speed, a reverse stage mode is entered, the sleeve 57 straddles and meshes with the drive gear 52 and the driven gear 55 in the state in which the first clutch C1 and the second clutch C2 are released, switching is made so that the synchromesh mechanism 58 is engaged, and the first brake B1 is locked. The input rotation input from the internal combustion engine to the input shaft 2 via the torque converter or lock-up clutch is input to the carrier CR and the input rotation of the carrier CR is inverted by the fixed ring gear R and output as the reversed rotation from the sun gear S due to the engagement of the first brake B1 in the planetary gear DP, so the reversed rotation is transferred to the hollow shaft 30 and transferred as the reversed rotation from the normal/reverse rotation output gear 31 to the input gear 51 of the deceleration gear mechanism 5.

The forward rotation transferred to the input gear 51 of the deceleration gear mechanism 5 is decelerated according to the difference in the diameter (difference in the number of teeth) between the normal/reverse rotation output gear 31 and the input gear 51 as in the gear start mode, transferred as forward rotation from the drive gear 52 to the output gear 56 via the sleeve 57 and the driven gear 55, and then transferred from the output gear 56 to the input gear 61 of the output gear portion 6 as reversed rotation. In addition, the reversed rotation transferred to the input gear 61 of the output gear portion 6 is transferred as forward rotation from the counter gear 62 to the driven gear 71 of the countershaft portion 7 while being decelerated according to the difference in the diameter (difference in the number of teeth) between the counter gear 62 and the driven gear 71. Then, the forward rotation transferred to the driven gear 71 of the countershaft portion 7 is further decelerated and inverted, and transferred from the drive gear 72 to the differential ring gear 80 of the differential device 8. Therefore, reversed rotation with a fixed transmission shift ratio as the backward mode is output to the wheels via the left and right drive shafts 81L and 81R.

In addition, when the predetermined speed is reached or exceeded during, for example, forward travel, then a first continuously variable mode (see FIG. 2A) is entered, the first clutch C1 is released in the release mode, and the second clutch C2 is engaged. At this time, although the synchromesh mechanism 58 is engaged since meshing between the sleeve 57 and the driven gear 55 is kept transitionally, further acceleration makes a shift to a second continuously variable mode (see FIG. 2A), releases meshing between the sleeve 57 and the driven gear 55, and releases the synchromesh mechanism 58. The input rotation from the internal combustion engine input to the input shaft 2 via the torque converter or lock-up clutch is thereby transferred as continuously variable rotation from the primary pulley 41 to the secondary pulley 42 via the belt 43 while undergoing a continuously variable speed change and then transferred from the drive shaft 60 of the output gear portion 6 to the counter gear 62 via the second clutch C2. The continuously variable rotation transferred from the counter gear 62 to the driven gear 71 of the countershaft portion 7 and then transferred to the driven gear 71 of the countershaft portion 7 is transferred to the differential ring gear 80 of the differential device 8 while being decelerated by the drive gear 72 and the forward rotation of the variable transmission shift ratio as the continuously variable mode is thereby output to the wheels via the left and right drive shafts 81L and 81R.

In addition, when the vehicle 1 is further accelerated, a third continuously variable mode (see FIG. 2A) is entered and the first clutch C1 is engaged. Accordingly, the first clutch C1 is engaged in the engagement mode in addition to the continuously variable speed change in the second continuously variable mode, the input rotation input from the internal combustion engine to the input shaft 2 is transferred to the hollow shaft 30 as is because the sun gear S and the carrier CR are integrally rotated and directly connected by the engagement of the first clutch C1 in the planetary gear DP, and the rotation is transferred as forward rotation from the normal/reverse rotation output gear 31 to the input gear 51 of the deceleration gear mechanism 5. The reversed rotation transferred to the input gear 51 of the deceleration gear mechanism 5 is decelerated according to the difference in the diameter (difference in the number of teeth) between the normal/reverse rotation output gear 31 and the input gear 51 and rotates the first rotary shaft 50 in reverse.

At this time, the forward continuously variable rotation transferred from the drive shaft 60 of the output gear portion 6 to the input gear 61 is transferred to the output gear 56 of the deceleration gear mechanism 5 as reversed rotation. Accordingly, the first rotary shaft 50 and the second rotary shaft 53 rotate in the same direction. Accordingly, since the relative rotational speed N between the first rotary shaft 50 and the second rotary shaft 53 becomes lower than in the case in which the first clutch C1 is kept in the release state and the first rotary shaft 50 does not substantially rotate, the wear of the bearing 54 can be suppressed.

The following describes the procedure with which the ECU 11 calculates the relative rotational speed (also referred to below simply as the relative rotational speed) N between the first rotary shaft 50 and the second rotary shaft 53 based on the detected input shaft rotational speed Nin and the detected output shaft rotational speed Nout.

First, when the second continuously variable mode in which the second clutch C2 is engaged and the synchromesh mechanism 58 is released is entered, if the release mode in which the first clutch C1 is released is entered, the rotation from the input shaft 2 is transferred to the drive shaft 60 via the second power transmission path a2. At the same time, rotational transfer is not performed in the part of the first power transmission path a1 from the input shaft 2 to the first rotary shaft 50. It is assumed that the input shaft rotational speed of the input shaft 2 is Nin, the transmission shift ratio in the continuously variable transmission mechanism 4 calculated from the input shaft rotational speed Nin and the output shaft rotational speed Nout is γ, and the known gear ratio between the input gear 61 of the output gear portion 6 and the output gear 56 of the deceleration gear mechanism 5 is $I_2$. In this case, the relative rotational speed N between the first rotary shaft 50 and the second rotary shaft 53 is calculated by the following expression.

$$N=(1/\gamma) \times I_2 \times N\text{in}$$

In addition, when the third continuously variable mode in which the second clutch C2 is engaged and the synchromesh mechanism 58 is released is entered, if the engagement mode in which the first clutch C1 is engaged is entered, the rotation from the input shaft 2 is transferred to the drive shaft 60 via the second power transmission path a2. At the same time, since the part of the first power transmission path a1 from the input shaft 2 to the first rotary shaft 50 is also connected, the first rotary shaft 50 is rotated. As for the rotational directions of the shafts, the first rotary shaft 50 rotates in the reverse direction since the input shaft 2 rotates in the forward rotational direction and the second rotary shaft 53 rotates in the reverse rotational direction since the input shaft 2 and the drive shaft 60 rotate in the forward direction, so the first rotary shaft 50 and the second rotary shaft 53 rotate in the same direction. The known gear ratio between the normal/reverse rotation output gear 31 of the forward/backward switching device 3 and the input gear 51 of the deceleration gear mechanism 5 is assumed to be $I_1$. In this case, the relative rotational speed N between the first rotary shaft 50 and the second rotary shaft 53 is calculated by the following expression.

$$N=((1/\gamma) \times I_2)-(1/I_1)) \times N\text{in}$$

Next, the operation of the automatic transmission 10 when the vehicle 1 travels in the continuously variable mode will be described with reference to the flowchart in FIG. 2B.

The ECU 11 determines whether the current travel mode is the second continuously variable mode or the third continuously variable mode (step S1). When the ECU 11 determines that the current travel mode is neither the second continuously variable mode nor the third continuously variable mode, the ECU 11 ends the processing.

When the ECU 11 determines that the current travel mode is either the second continuously variable mode or the third continuously variable mode, the ECU 11 determines whether the relative rotational speed N is equal to or less than the first threshold $N_1$ (step S2). When the ECU 11 determines that the relative rotational speed N is equal to or less than the first threshold $N_1$, the ECU 11 releases the first clutch C1 and enters the release mode (step S3) because the differential rotation is small and the friction force of the bearing 54 is small. This changes the travel mode to the second continuously variable mode (step S4) and the ECU 11 ends the processing. Since the travel mode changes to the second continuously variable mode, the rotation of the input shaft 2 is disconnected by the first clutch C1 in the first power transmission path a1 and transferred to the drive shaft 60 via the second power transmission path a2. Since the part from the hollow shaft 30 to the first rotary shaft 50 does not substantially rotate, the rotational resistance can be made smaller than in the case in which the part from the hollow shaft 30 to the first rotary shaft 50 rotates, and the fuel economy can be improved.

In contrast, when the ECU 11 determines that the relative rotational speed N is more than the first threshold $N_1$ in step S2, the ECU 11 determines whether the relative rotational speed N is equal to or more than the second threshold $N_2$ (step S5). When the ECU 11 determines that the relative rotational speed N is less than the second threshold $N_2$, the ECU 11 ends the processing. When the ECU 11 determines that the relative rotational speed N is equal to or more than the second threshold $N_2$, the ECU 11 engages the first clutch C1 to enter the engagement mode because the differential rotation is large and the friction force of the bearing 54 is large (step S6). This changes the travel mode to the third continuously variable mode (step S7) and the processing ends. When the travel mode changes to the third continuously variable mode, the rotation of the input shaft 2 is connected by the first clutch C1 in the first power transmission path a1 and the part up to the first rotary shaft 50 is rotated. Accordingly, the relative rotational speed N can be reduced.

As described above, in the automatic transmission 10 according to the embodiment, the engagement mode in which the first clutch C1 is put in the engagement state is executed when the vehicle 1 travels forward in the continuously variable mode in which the second clutch C2 is put in the engagement state and the synchromesh mechanism 58 is put in the release state, the driving torque input from the input shaft 2 is transferred to the drive shaft 60 via the second clutch C2 in the second power transmission path a2 and is rotationally transferred to the second rotary shaft 53 operating together with the second power transmission path a2. At the same time, the driving torque input from the input shaft 2 is rotationally transferred to the first rotary shaft 50 via the first clutch C1 in the first power transmission path a1. At this time, the rotational direction of the first rotary shaft 50 is the same as the rotational direction of the second rotary shaft 53.

Since the first rotary shaft 50 and the second rotary shaft 53 rotate in the same direction, the relative rotational speed N between the first rotary shaft 50 and the second rotary shaft 53 becomes smaller than in the release mode in which the first clutch C1 is released. Since this reduces the relative rotational speed N when the vehicle 1 travels forward at a high speed, it is possible to reduce the friction force generated in the bearing 54 supporting the first rotary shaft 50 and the second rotary shaft 53 in a relatively rotatable manner, reduce the wear speed of the bearing 54, and prolong the service life of the bearing 54.

Figure 2B:
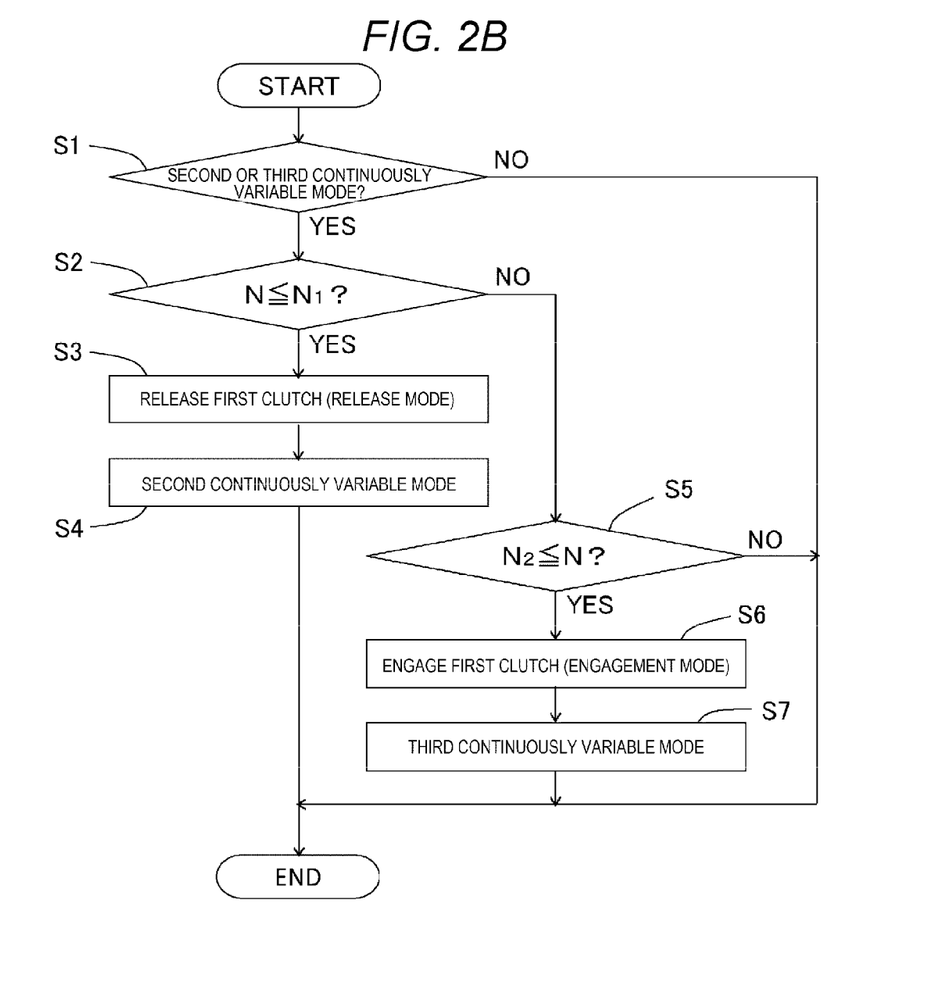
FIG. 2B is a flowchart.

In addition, in the automatic transmission 10 according to the embodiment, if the relative rotational speed N between the first rotary shaft 50 and the second rotary shaft 53 is less than the first threshold $N_1$ when the vehicle 1 travels forward in the continuously variable mode in which the second clutch C2 is put in the engagement state and the synchromesh mechanism 58 is put in the release state, the release mode in which the first clutch C1 is put in the release state is executed (see steps S2 and S3 in FIG. 2B).

Accordingly, the rotation of the input shaft 2 is disconnected by the first clutch C1 in the first power transmission path a1 and transferred to the drive shaft 60 via the second power transmission path a2 and the part from the hollow shaft 30 to the first rotary shaft 50 does not substantially rotate, so the rotational resistance can be made smaller than in the case in which the part from the hollow shaft 30 to the first rotary shaft 50 rotates and the fuel economy can be improved.

In addition, in the automatic transmission 10 according to the embodiment, if the relative rotational speed N between the first rotary shaft 50 and the second rotary shaft 53 is more than the second threshold $N_2$ that is more than the first threshold $N_1$ when the vehicle 1 travels forward in the continuously variable mode in which the second clutch C2 is put in the engagement state and the synchromesh mechanism 58 is put in the release state, the engagement mode in which the first clutch C1 is put in the engagement state is executed (see steps S5 and S6 in FIG. 2B). Since the second threshold $N_2$ is set to a value larger than the first threshold $N_1$, the frequency of hunting can be made smaller than in the case in which one threshold is used to determine whether the release mode or the engagement mode is executed.

In addition, in the automatic transmission 10 according to the embodiment, the transmission mechanism is the continuously variable transmission mechanism 4 capable of continuously changing the transmission shift ratio, the first mode is the non-continuously variable mode, and the second mode is the continuously variable mode. Accordingly, in the automatic transmission 10 having the continuously variable transmission mechanism 4, it is possible to reduce the friction force generated in the bearing 54 supporting the first rotary shaft 50 and the second rotary shaft 53 in a relatively rotatable manner when the vehicle 1 travels forward at a high speed, reduce the wear speed of the bearing 54, and prolong the service life of the bearing 54. In addition, in the automatic transmission 10 according to the embodiment, the first engagement element is the synchromesh mechanism 58 capable of meshing the drive gear 52 rotating integrally with the first rotary shaft 50 with the driven gear 55 rotating integrally with the second rotary shaft 53. Since this reduces the relative rotational speed N when the vehicle 1 travels forward at a high speed, it is possible to reduce the friction force generated in the bearing 54 supporting the first rotary shaft 50 and the second rotary shaft 53 in a relatively rotatable manner, reduce the wear speed of the bearing 54, and prolong the service life of the bearing 54.

Although the first engagement element is the synchromesh mechanism 58 and the second engagement element is the second clutch C2 in the above embodiment, the disclosure is not limited to the embodiment. For example, these engagement elements may be configured by a dog clutch, brake, and the like.

In addition, in the above embodiment, although the first threshold $N_1$ is set as the threshold of the relative rotational speed N for switching from the third continuously variable mode to the second continuously variable mode and the second threshold $N_2$, which is larger than the first threshold $N_1$, is set as the threshold of the relative rotational speed N for switching from the second continuously variable mode to the third continuously variable mode, the disclosure is not limited to the embodiment. For example, one threshold may set and only this threshold may used to determine switching between the second continuously variable mode and the third continuously variable mode.

Although the synchromesh mechanism 58 is disposed between the forward/backward switching device 3 and the drive shaft 60 in the above embodiment, the disclosure is not limited to the embodiment and the synchromesh mechanism 58 may be disposed between the forward/backward switching device 3 and the input shaft 2. Similarly, although the second clutch C2 is disposed between the continuously variable transmission mechanism 4 and the drive shaft 60 in the above embodiment, the disclosure is not limited to the embodiment and the second clutch C2 may be disposed between the continuously variable transmission mechanism 4 and the input shaft 2. That is, the second rotary shaft 53 is disposed on a shaft side of one of the input shaft 2 and the drive shaft 60 from the synchromesh mechanism 58 in the first power transmission path a1, operates together with the one of these shafts, and is disposed as a double shaft overlapped in the shaft direction with the first rotary shaft 50.

In addition, although the structure in which the planetary gear DP is used as the forward/backward switching device 3 is used in the above embodiment, the disclosure is not limited to the embodiment and another structure may be used.

In addition, although the continuously variable transmission mechanism 4 is used as the transmission mechanism, the disclosure is not limited to the embodiment and a multi-stage transmission mechanism may be applied.

INDUSTRIAL APPLICABILITY

The automatic transmission relates to an automatic transmission having a continuously variable transmission mechanism and a forward/backward switching device and is preferably applied to an automatic transmission having a first power transmission path provided via a forward/backward switching device and a second power transmission path provided parallel to the first power transmission path via a continuously variable transmission mechanism.

The invention claimed is:

1. An automatic transmission comprising:
   an input shaft to be drivably coupled to a driving source of a vehicle;
   a drive shaft to be drivably coupled to a wheel;
   a forward/backward switching device having a forward engagement element forming a path for transferring rotation in a forward direction of the vehicle when engaged and a backward engagement element forming a path for transferring rotation in a backward direction of the vehicle when engaged;
   a transmission mechanism capable of changing a transmission shift ratio;
   a first engagement element present in a first power transmission path coupling the input shaft to the drive shaft via the forward/backward switching device;
   a second engagement element present in a second power transmission path coupling the input shaft to the drive shaft via the transmission mechanism;
   wherein a first mode is entered in which the forward engagement element and the first engagement element are put in an engagement state and the input shaft is connected to the drive shaft via the first power transmission path for rotational transfer when the vehicle travels forward at a speed less than a predetermined speed or a second mode is entered in which the second engagement element is put in the engagement state and the input shaft is connected to the drive shaft via the second power transmission path for rotational transfer when the vehicle travels forward at a speed equal to or more than the predetermined speed,
   a first rotary shaft disposed in a part of the first power transmission path on the forward/backward switching device side from the first engagement element, the first rotary shaft operating together with the forward/backward switching device;
   a second rotary shaft disposed in a part of the first power transmission path on a shaft side of one of the input shaft and the drive shaft from the first engagement element, the second rotary shaft operating together with the one of the input shaft and the drive shaft, the second rotary shaft being disposed as a double shaft overlapped in a shaft direction with the first rotary shaft; and
   a bearing present so as to be overlapped in the shaft direction with the first rotary shaft and the second rotary shaft between the first rotary shaft and the second rotary shaft, the bearing supporting the first rotary shaft and the second rotary shaft in a relatively rotatable manner,
   wherein an engagement mode in which the forward engagement element is put in the engagement state is executed when the vehicle travels forward in the second mode in which the second engagement element is put in the engagement state and the first engagement element is put in a release state.

2. The automatic transmission according to claim 1, wherein, when the vehicle travels forward in the second mode in which the second engagement element is put in the engagement state and the first engagement element is put in the release state, if a difference in a rotational speed between the first rotary shaft and the second rotary shaft is smaller than a first threshold, a release mode in which the forward engagement element is put in the release state is executed.

3. The automatic transmission according to claim 2, wherein, when the vehicle travels forward in the second mode in which the second engagement element is put in the engagement state and the first engagement element is put in the release state, if the difference in the rotational speed is larger than a second threshold that is larger than the first threshold, the engagement mode in which the forward engagement element is put in the engagement state is executed.

4. The automatic transmission according to claim 3, wherein:
   the transmission mechanism is a continuously variable transmission mechanism capable of continuously changing the transmission shift ratio,
   the first mode is a non-continuously variable mode, and
   the second mode is a continuously variable mode.

5. The automatic transmission according to claim 4, wherein the first engagement element is a synchromesh mechanism capable of meshing a first gear rotating integrally with the first rotary shaft with a second gear rotating integrally with the second rotary shaft.

6. The automatic transmission according to claim 1, wherein:
   the transmission mechanism is a continuously variable transmission mechanism capable of continuously changing the transmission shift ratio,
   the first mode is a non-continuously variable mode, and
   the second mode is a continuously variable mode.

7. The automatic transmission according to claim 2, wherein:
   the transmission mechanism is a continuously variable transmission mechanism capable of continuously changing the transmission shift ratio,
   the first mode is a non-continuously variable mode, and
   the second mode is a continuously variable mode.

8. The automatic transmission according to claim 1, wherein the first engagement element is a synchromesh mechanism capable of meshing a first gear rotating integrally with the first rotary shaft with a second gear rotating integrally with the second rotary shaft.

9. The automatic transmission according to claim 2, wherein the first engagement element is a synchromesh mechanism capable of meshing a first gear rotating integrally with the first rotary shaft with a second gear rotating integrally with the second rotary shaft.

10. The automatic transmission according to claim 3, wherein the first engagement element is a synchromesh mechanism capable of meshing a first gear rotating integrally with the first rotary shaft with a second gear rotating integrally with the second rotary shaft.

11. The automatic transmission according to claim 6, wherein the first engagement element is a synchromesh mechanism capable of meshing a first gear rotating integrally with the first rotary shaft with a second gear rotating integrally with the second rotary shaft.

12. The automatic transmission according to claim 7, wherein the first engagement element is a synchromesh mechanism capable of meshing a first gear rotating integrally with the first rotary shaft with a second gear rotating integrally with the second rotary shaft.

\* \* \* \* \*